June 23, 1942.  W. K. SMITH  2,287,204
DOMESTIC APPLIANCE
Filed Sept. 30, 1938  3 Sheets-Sheet 3
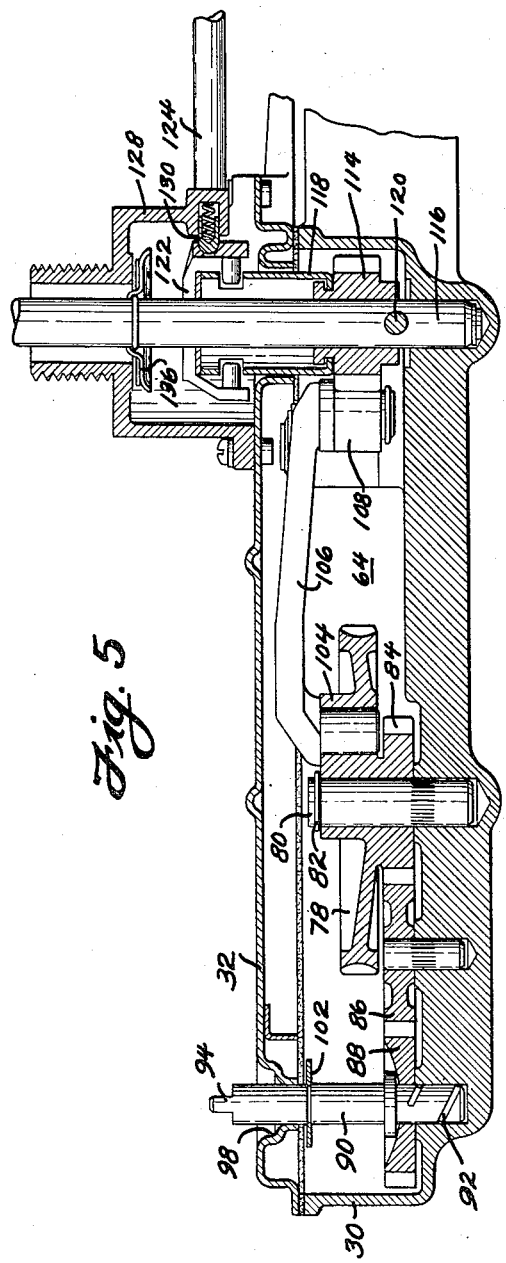
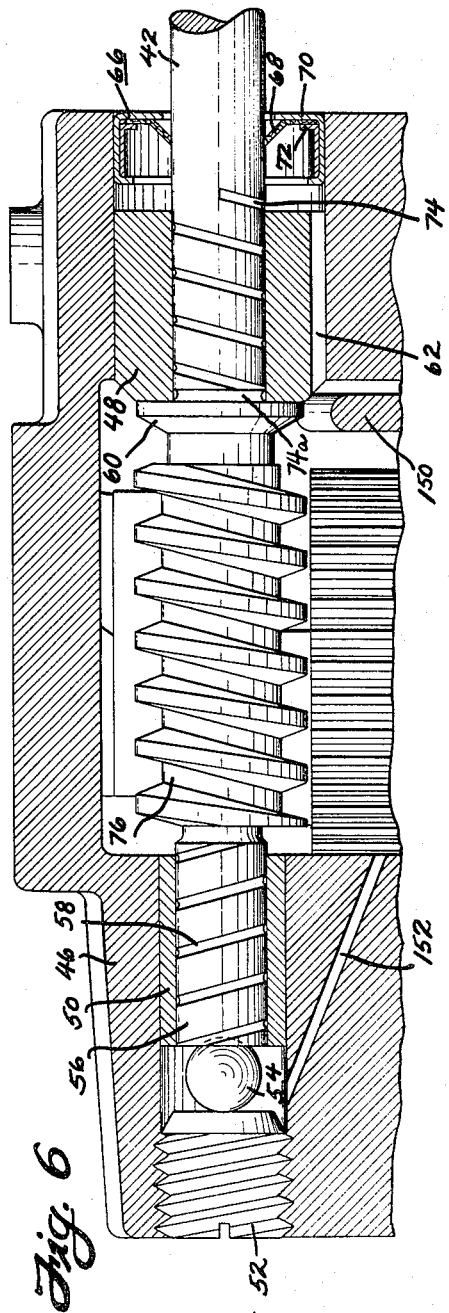
INVENTOR.
William K. Smith
BY Spencer Hardman and Fehr
ATTORNEYS Patented June 23, 1942

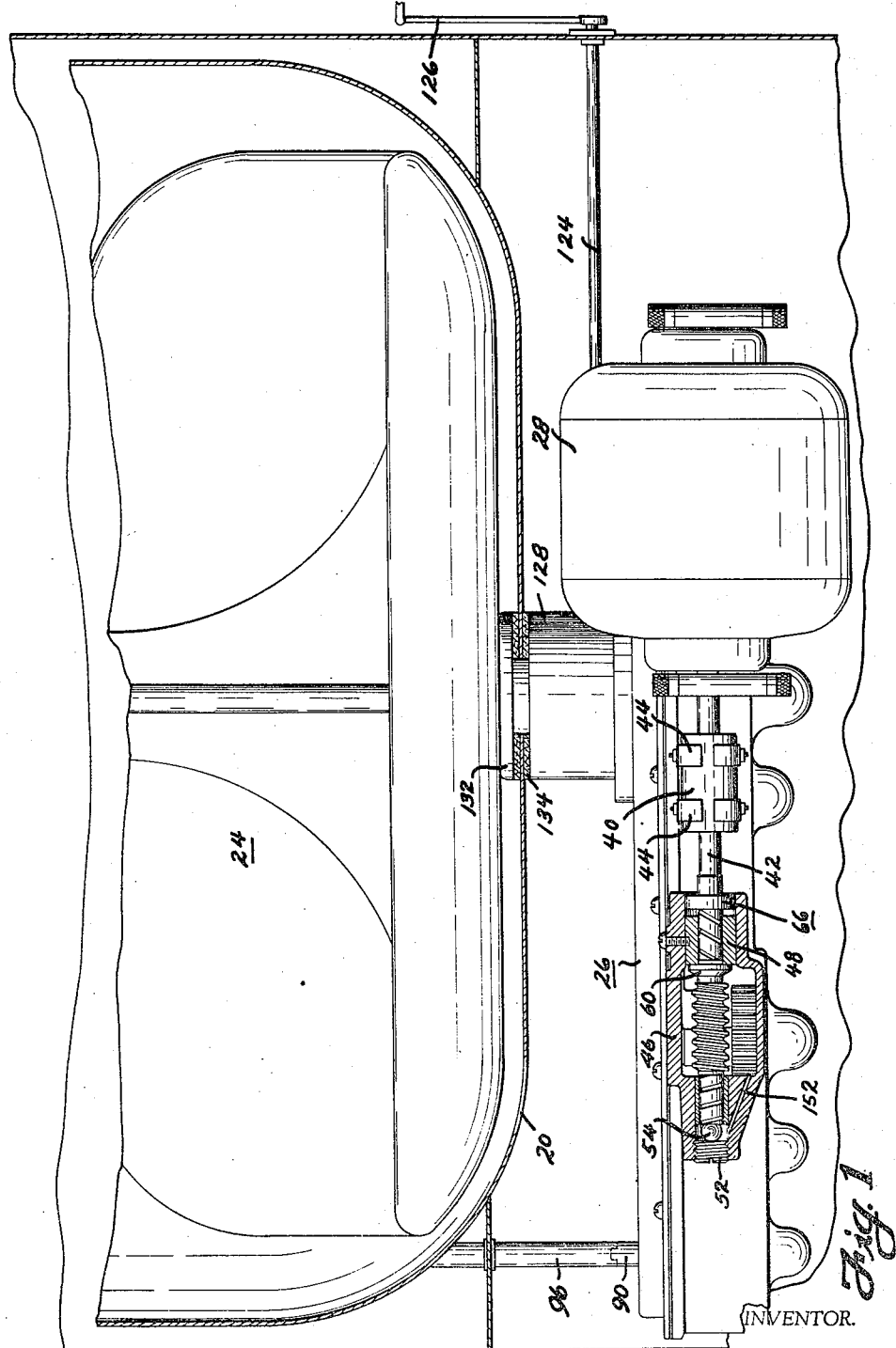

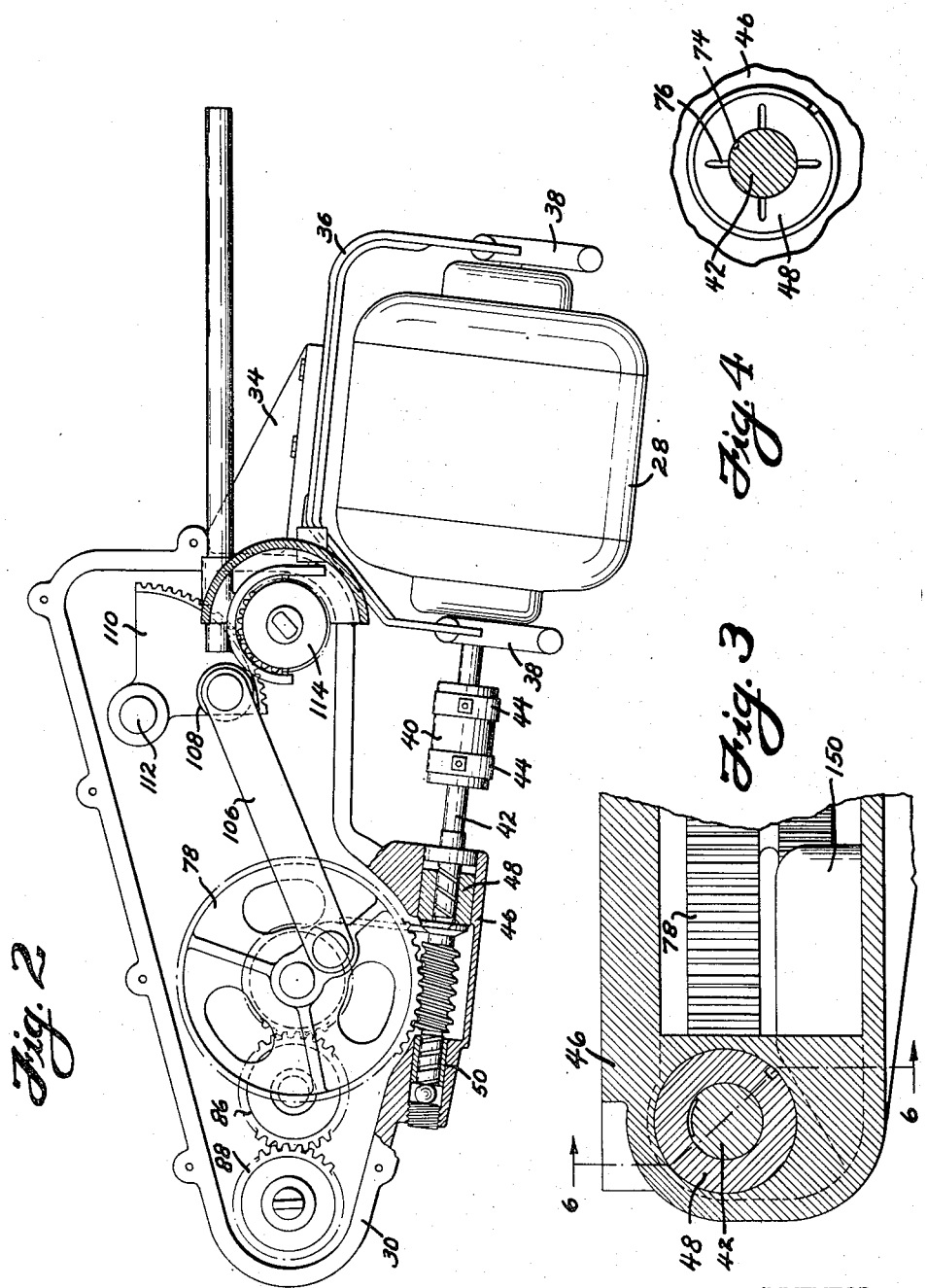

2,287,204

UNITED STATES PATENT OFFICE 2,287,204

DOMESTIC APPLIANCE

William K. Smith, Dayton, Ohio, assignor to General Motors Corporation, Dayton, Ohio, a corporation of Delaware Application September 30, 1938, Serial No. 232,588

6 Claims. (Cl. 184—13)

This invention relates to a domestic appliance and more particularly to washing machines and an operating mechanism therefor.

It is an object of my invention to provide an improved simplified washing machine mechanism with an extremely simple yet highly efficient lubricating system for all the bearings including the thrust bearing for the worm shaft.

Further objects and advantages of the present invention will be apparent from the following description, reference being had to the accompanying drawings, wherein a preferred form of the present invention is clearly shown.

In the drawings:

Fig. 1 is a fragmentary sectional view of a washing machine embodying my invention;

Fig. 2 is a top view of the operating mechanism with the cover removed;

Fig. 3 is a sectional view through the main worm bearing shown in Fig. 2;

Fig. 4 is an end view of the main worm bearing showing the oil feeding grooves in the thrust face of the bearing;

Fig. 5 is a vertical sectional view through the operating mechanism; and

Fig. 6 is a sectional view along the lines 6—6 of Fig. 3.

Referring now to the drawings and more particularly Fig. 1, there is shown a washing machine having a tub 20 surrounded by an outer casing 22. Within the casing is a four bladed agitator 24 which is driven from beneath by the operating mechanism 26 which in turn is driven by the electric motor 28. The operating mechanism 26 is housed in a gear case having a lower flanged casting 30 and an upper sheet metal cover 32. The casting is provided with an angle bracket 34 to which is fastened a U-shaped support 36 which is connected by resilient mountings 38 to the electric motor. The electric motor has its drive shaft coupled by a sleeve 40 of a rubber-like material to the worm shaft 42. The sleeve 40 is clamped by the clamps 44 to the worm shaft and to the drive shaft of the electric motor. This provides a flexible coupling which is noiseless and which prevents the transmission of sound and vibrations.

The worm shaft extends into the gear case and the lower casting 30 is provided with a projection 46 containing a bearing 48 at one end and a bearing 50 at the opposite end. At this opposite end, a screw plug 52 closes this end of the projection 46 and between the screw plug 52 and the adjacent end of the worm shaft 42 a hardened steel ball 54 is provided for taking up any end thrust of the shaft in this direction. The worm shaft 42 has a bearing portion 56 which is provided with a helical groove 58 for working the lubricant from the chamber containing the ball 54 into the main chamber of the gear case in order to prevent oil from leaking out through the plug 52.

The main thrust of the worm shaft is taken up by the shoulder 60 which bears against the inner end of the plain bearing 48. Heretofore I have found that the thrust bearing provided between this shoulder and the plain bearing does not receive proper lubrication since no means are provided for feeding the lubricant to the bearing between this shoulder and the end of the plain bearing 48. Therefore I have provided lubricant slot 62 leading from the main chamber 64 of the casting 30 to the outer end of the plain bearing 48.

In order to prevent the escape of lubricant from the chamber provided at the outer end of the plain bearing 48 I have provided a very simple form of shaft seal 66 including a leather or fibre member 68 having its outer edge held between the ring 70 and the ring 72. The ring 70 fits tightly into the opening provided in the projection 46. The leather or fibre member 68 is provided with a conical shaped inner periphery which tightly engages the worm shaft 42 to prevent the escape of lubricant.

From the chamber provided between the outer end of the plain bearing 48 and the shaft seal 66, a helical lubricant groove 74 extends to the base of the shoulder 60 where a circular lubricant groove 74a is provided. The worm shaft rotates in such a direction that lubricant is fed from the portion of the groove at the outer edge of the plain bearing 48 and carried to the circular groove at the base of the shoulder where an oil pressure is built up. As shown in Fig. 4 the inner face of the plain bearing 48 is provided with radial lubricant grooves 76 which stop short of the outer periphery of the bearing portion on the inner face of the plain bearing 48 as well as the shoulder 60. The lubricant is fed from the circular lubricant groove into these radial grooves 76 from which the lubricant is distributed over the entire face of the thrust bearing between the shoulder 60 and the inner face of the plain bearing 48. In this way the thrust bearing is provided with excellent lubrication so that wear is minimized.

The worm 76 is provided on the worm shaft 42 between the bearing portion 56 and the shoulder 60. The worm 76 operates a worm wheel 78 which is rotatably mounted upon the stud 80 fixed in an aperture in the bottom of the casting 30. The worm wheel 78 is held in place on the stud by a snap ring 82. The worm wheel 78 is provided with an integral spur gear 84 which meshes with an idler gear 86 also mounted upon a stud fitted into the bottom of the casting 30 which in turn drives a spur gear 88 fixed to a drive shaft 90 which drives the wringer mechanism.

This drive shaft 90 has its lower end fitted into a plain bearing lubricated by a lubricant groove 92 which is helical and which is adapted to carry lubricant down into the bottom dead-end of the bearing in order to provide satisfactory lubrication. The upper end of the shaft 90 is provided with a tongue 94 for making connection with the connecting shaft 96 which connects to the wringer mechanism. This connection is made by a simple tongue and slot connection. The top of the gear case is provided with a flanged opening 98 through which the shaft 90 projects. The shaft 90 is provided with the washer 102 for preventing the escape of lubricant from the gear case through the opening 98.

The worm gear 78 is provided with an eccentrically positioned bearing 104 which receives the integral pin at one end of a sort of U-shaped connecting rod 106 which has its other end also formed with a bearing portion fitting into the bearing 108 provided in the sector gear 110, pivotally mounted upon a stud 112 likewise projecting upwardly from the bottom of the casing 30. The sector gear 110 meshes with a spur gear 114 which is rotatably and slidably mounted upon the agitator shaft 116.

The spur gear 114 is provided with a flange which is connected to a clutch sleeve 118, used to move the spur gear 114 upwardly out of engagement with the drive pin 120 upon the agitator shaft 116. The spur gear 114 is provided with a notch which is adapted to engage this drive pin 120 so that when engaged the spur gear will oscillate the agitator shaft 116 in order to operate the agitator 24. The clutch sleeve 118 does not rotate with the spur gear 114 but is prevented from rotation by the clutch fork 122 having pins engaging apertures in the sides of the clutch sleeve 118. This clutch shifting fork is fixed to the clutch shifting rod 124 which extends laterally beneath the tub 20 and is provided with an operating handle 126 upon the outside of the outer casing 22.

This clutch operating shaft 124 is rotatably mounted in a sleeve 128 which is mounted on top of the cover 32 of the gear case. This sleeve 128 is provided with a spring detent 130 which engages notches in the clutch fork 122 in order to resiliently latch the clutch fork in either the engaging or disengaging position. A flanged sleeve 132 is threaded onto the upper extension of the sleeve 128 and clamps the gaskets 134 tightly around the central aperture of the bottom of the tub 20 so as to prevent leakage. This sleeve 132 extends upwardly within the agitator 24 and surrounds the upper portion of the agitator shaft 116, in order to prevent leakage of water out of the tub 20. The agitator shaft 116 is provided with a slinger 136 for preventing the escape of lubricant upwardly along the agitator shaft 116. The agitator shaft 116 at the top of the flanged sleeve 132 is connected to the agitator 24.

I find that this construction provides a very economical, efficient, operating mechanism which has sufficient lubrication. The gear case is filled with lubricant up to about the axis of the worm gear and this enables the worm and worm gear to be lubricated as well as the sector gear 110, the spur gear 114 and the spur gears 86 and 88. The gear case is provided with a rib 150 directly beneath the worm wheel 78 so that as the worm wheel rotates the lubricant is carried around by the worm wheel and banks up between the rib 150 and the wall of the gear case beneath the worm wheel. This insures an adequate supply of lubricant under a slight extra pressure to the lubricant passage 62 in the bearing 48. Lubricant is also fed from the main portion of the gear case through the passage 152 to the ball chamber containing the ball 54 at the end of the bearing portion 56. The lubricant is then fed between the bearing portion 56 and the bearing 50 by the groove 58 to carry the lubricant back to the worm. The helical grooves insure satisfactory lubrication to the bearings.

While the form of embodiment of the invention as herein disclosed, constitutes a preferred form, it is to be understood that other forms might be adopted, all coming within the scope of the claims which follow.

What is claimed is as follows:

1. In combination, a gear case, a worm and worm wheel rotatably mounted in the gear case, said worm being provided with a worm shaft portion, said gear case being provided with a plain bearing portion for rotatably supporting the worm shaft portion, said worm shaft portion being provided with a shoulder fitting against one end of the bearing portion, one of said portions being provided with a generally helical lubricant groove extending between the shaft portion and the bearing portion to said shoulder for feeding lubricant between said shoulder and the bearing portion, said gear case being provided with lubricant up to the level of said bearing portion and said worm for supplying lubricant to the bearing portion and parts within said gear case, said shaft portion being provided with a generally circular groove at the base of said shoulder connecting with said helical groove.

2. In combination, a lubricant case, a gear shaft portion, said case being provided with a plain bearing portion for rotatably supporting the shaft portion, said shaft portion being provided with a shoulder fitting against one end of the bearing portion, one of said portions being provided with a generally helical lubricant groove extending between the shaft portion and the bearing portion to said shoulder for feeding lubricant between said shoulder and the bearing portion, said case being provided with lubricant up to the level of said bearing portion for supplying lubricant to the bearing portion and parts within said case, said bearing portion having a face adjacent the face of said shoulder, said shaft portion being provided with a generally circular groove at the base of said shoulder connecting with said helical groove.

3. In combination, a gear case, a worm and worm wheel rotatably mounted in the gear case, said worm being provided with a worm shaft portion, said gear case being provided with a plain bearing portion for rotatably supporting the worm shaft portion, said worm shaft portion being provided with a shoulder fitting against one end of the bearing portion, one of said portions being provided with a generally helical lubricant groove extending between the shaft portion and the bearing portion to said shoulder for feeding lubricant between said shoulder and the bearing portion, said gear case being provided with lubricant up to the level of said bearing portion and said worm for supplying lubricant to the bearing portion and parts within said gear case, said gear case being provided with a rib cooperating with the worm wheel for raising the lubricant level adjacent said worm shaft bearing portion.

4. In combination, a gear case, a worm and worm wheel rotatably mounted in the gear case, said worm being provided with a worm shaft portion, said gear case being provided with a plain bearing portion for rotatably supporting the worm shaft portion, said worm shaft portion being provided with a shoulder fitting against one end of the bearing portion, one of said portions being provided with a generally helical lubricant groove extending between the shaft portion and the bearing portion to said shoulder for feeding lubricant between said shoulder and the bearing portion, said gear case being provided with lubricant up to the level of said bearing portion and said worm for supplying lubricant to the bearing portion and parts within said gear case, said gear case being provided with a guiding rib means beneath the worm wheel for trapping lubricant carried around by the worm wheel and raising the level of the lubricant in the adjacent portion of the case, said gear case being provided with a passage for conducting lubricant from the trapped raised lubricant level portion of the gear case to the other end of said bearing portion.

5. In combination, a gear case, a worm wheel in said gear case having a substantially vertical axis, a worm shaft drivingly connected to said worm wheel and having a bearing in said gear case, and a baffle extending across the greater portion of the distance between said worm wheel and the bottom of said case for banking lubricant circulated by said worm wheel toward said bearing.

6. In combination, a gear case, a horizontal gear in said gear case, a shaft drivingly connected to said gear and having a bearing, and a baffle extending across the greater portion of the distance between said gear and the bottom of said case for banking lubricant circulated by said gear toward said bearing.

WILLIAM K. SMITH.